US007474802B2

(12) United States Patent
Zhou et al.

(10) Patent No.: US 7,474,802 B2
(45) Date of Patent: Jan. 6, 2009

(54) METHOD AND APPARATUS FOR AUTOMATICALLY ESTIMATING THE LAYOUT OF A SEQUENTIALLY ORDERED SERIES OF FRAMES TO BE USED TO FORM A PANORAMA

(75) Inventors: Hui Zhou, Toronto (CA); Alexander Sheung Lai Wong, Scarborough (CA)

(73) Assignee: Seiko Epson Corporation, Tokyo (JP)

( * ) Notice: Subject to any disclaimer, the term of this patent is extended or adjusted under 35 U.S.C. 154(b) by 386 days.

(21) Appl. No.: 11/191,455

(22) Filed: Jul. 28, 2005

(65) Prior Publication Data

US 2007/0025639 A1  Feb. 1, 2007

(51) Int. Cl.
*G06K 9/36* (2006.01)

(52) U.S. Cl. ................... 382/284; 382/294
(58) Field of Classification Search .............. 382/284, 382/294
See application file for complete search history.

(56) References Cited

U.S. PATENT DOCUMENTS 5,987,164 A * 11/1999 Szeliski et al. ............. 382/154
6,078,701 A    6/2000 Hsu et al. .................. 382/294
6,473,536 B1  10/2002 Chiba et al. ................ 382/284
6,701,030 B1   3/2004 Uyttendaele et al. ........ 382/284
6,717,608 B1   4/2004 Mancuso et al. ............. 348/36
6,798,923 B1   9/2004 Hsieh et al. ................ 382/284
7,095,905 B1*  8/2006 Peterson .................... 382/284
7,239,805 B2*  7/2007 Uyttendaele et al. ........ 396/222
2002/0028026 A1  3/2002 Chen et al. ................ 382/284
2002/0141626 A1 10/2002 Caspi ....................... 382/131
2003/0090496 A1  5/2003 Cahill et al. ............... 345/646
2003/0179923 A1  9/2003 Xiong et al. ............... 382/154
2004/0091171 A1  5/2004 Bone ........................ 382/284
2004/0222987 A1 11/2004 Chang et al. ............... 345/419

* cited by examiner

*Primary Examiner*—Samir A Ahmed
*Assistant Examiner*—Stephen R Koziol
(74) *Attorney, Agent, or Firm*—Mark P. Watson

(57) ABSTRACT

A method of automatically estimating the layout of a sequentially ordered series of frames to be used to form a panorama comprises examining frames of the series to determine an initial flow direction and identifying a first interruption in the series of frames. The frames are then ranked in an evenly ranked matrix according to matrix dimensions based at least partly upon the initial flow direction and characteristics of the first interruption. An apparatus and computer readable media embodying a computer program for automatically estimating the layout of a sequentially ordered series of frames to be used to form a panorama are also provided.

16 Claims, 4 Drawing Sheets

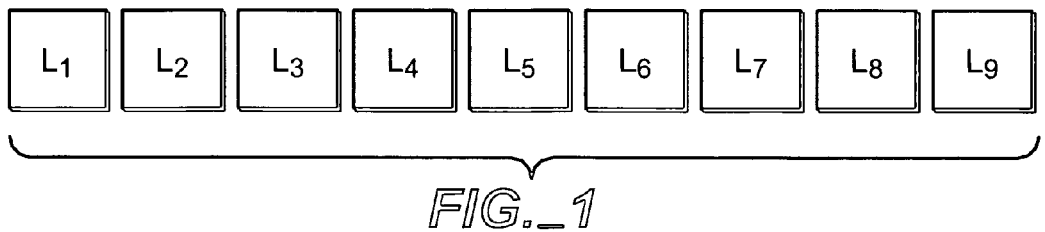
FIG._1
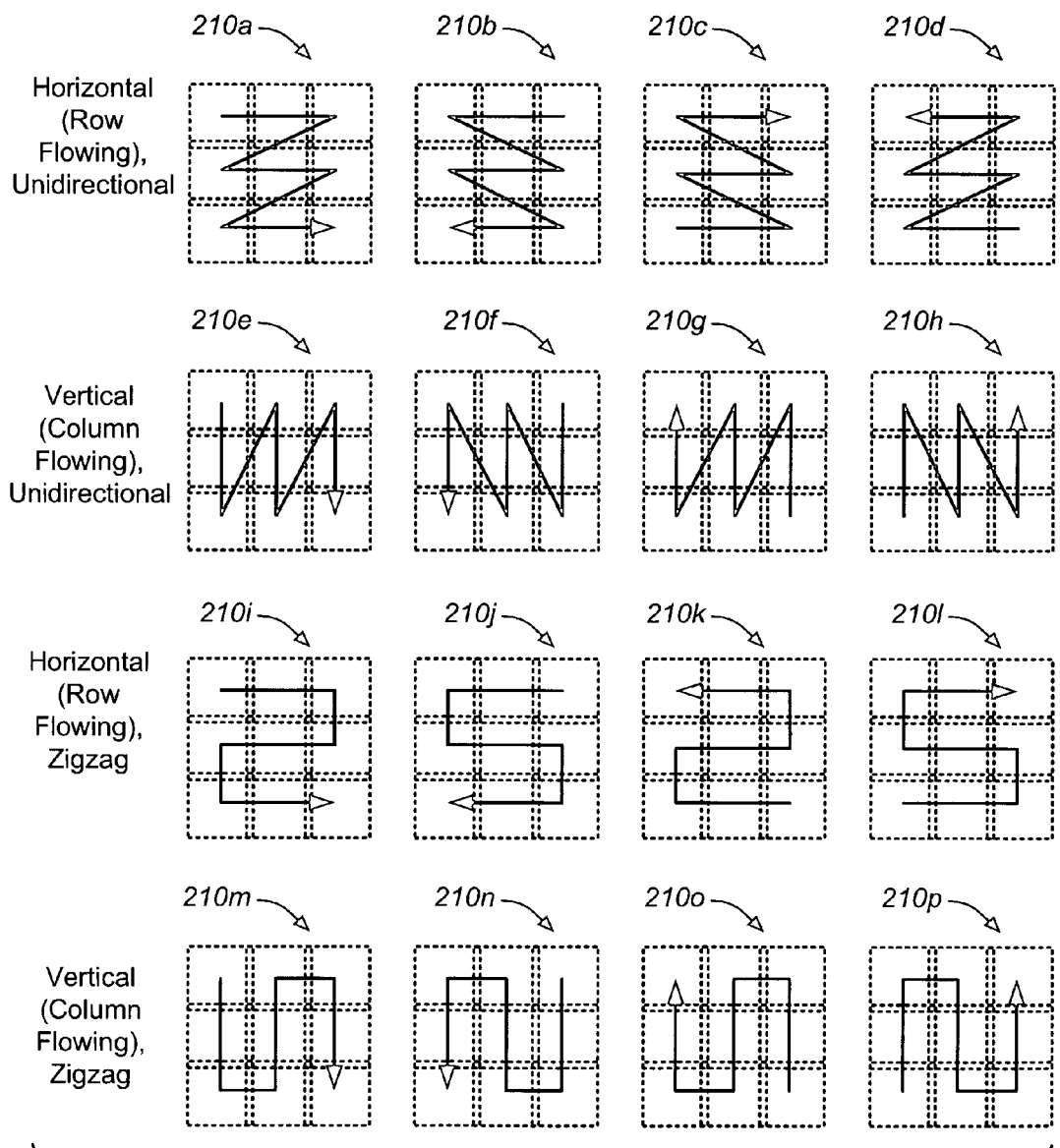
FIG._2

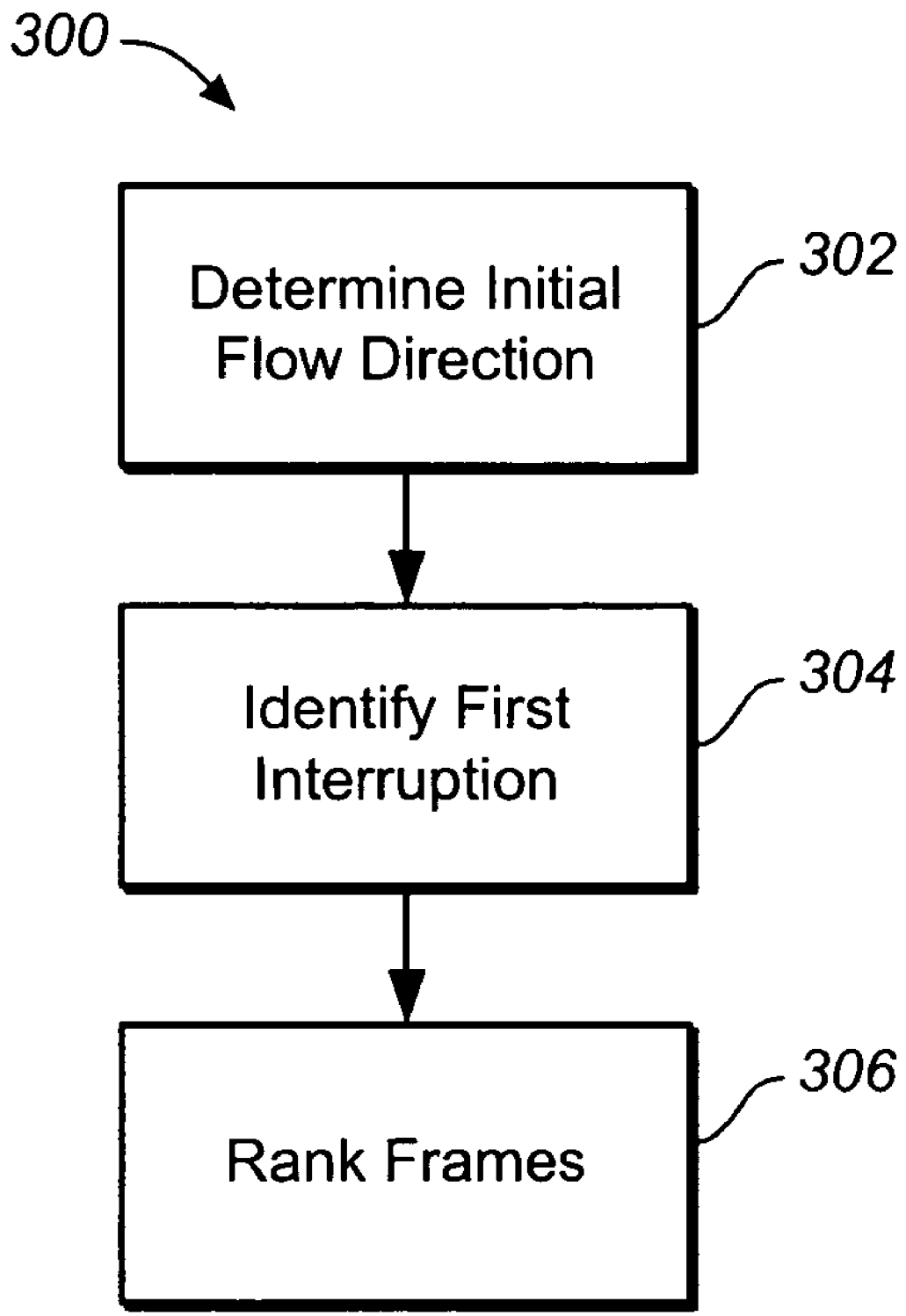
FIG._3

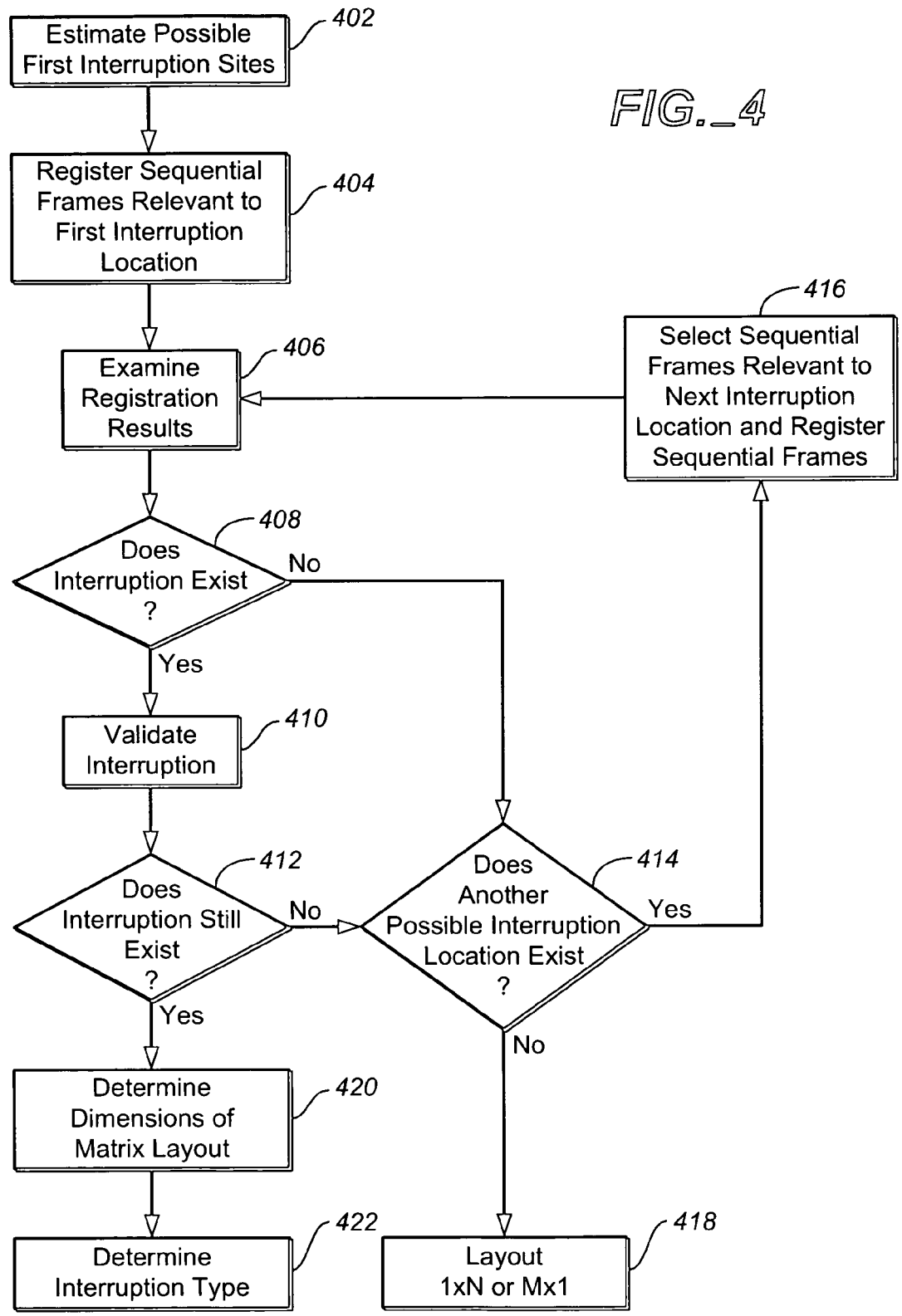
FIG._4

METHOD AND APPARATUS FOR AUTOMATICALLY ESTIMATING THE LAYOUT OF A SEQUENTIALLY ORDERED SERIES OF FRAMES TO BE USED TO FORM A PANORAMA

FIELD OF THE INVENTION

The present invention relates generally to image processing, and more particularly to a method, apparatus and computer program for automatically estimating the layout of a sequentially ordered series of frames to be used to form a panorama.

BACKGROUND OF THE INVENTION

Generating composite or panoramic images, or more simply panoramas, from sets of still images or sequences of video frames (collectively "frames") is known. In this manner, information relating to the same physical scene at a plurality of different time instants, viewpoints, fields of view, resolutions, and the like from the frames is melded to form a single wider angle image.

To generate a panorama, the various frames are geometrically and calorimetrically registered, aligned and then merged or stitched together to form a view of the scene as a single coherent image. During registration, each frame is analyzed to determine if it can be matched with previous frames. A displacement field that represents the offset between the frames is determined and then the frame is warped to the others to remove or minimize the offset.

In order for the panorama to be coherent, points in the panorama must be in one-to-one correspondence with points in the scene. Accordingly, given a reference coordinate system on a surface to which the frames are warped and combined, it is necessary to determine the exact spatial mapping between points in the reference coordinate system and pixels of each frame.

Prior to stitching, the frames to be used to form the panorama are typically arranged in the desired order (i.e. layout) thereby to facilitate the frame registration process. If the number of frames is small, manually performing this step is relatively easy. However, when the number of frames to be used to form the panorama is large, the task of ordering the frames can be time consuming and tedious. In such cases, being able to automatically estimate the frame layout is advantageous.

Techniques to mosaic images to form panoramas have been considered. For example, U.S. Pat. No. 6,078,701 to Hsu et al. discloses a method and apparatus for determining the topology of a sequence of images and then globally aligning the images with respect to each image's neighboring images. The topology determination and global alignment processes are iterated to progressively produce accurately aligned images allowing a plurality of source images to be combined into a seamless panoramic mosaic representation of a scene. During topology determination, pairs of images that spatially overlap each other are identified. Local coarse registration is performed to estimate a low complexity approximate spatial mapping between the neighboring images. Local fine registration is used to estimate a higher complexity mapping between neighboring images.

U.S. Pat. No. 6,798,923 to Hsieh to el. discloses a method of merging a pair of images to form a panoramic image. A set of feature points defining edge orientations are extracted along the edges of the images. Registration parameters are obtained by determining an initial set of feature points from an image which matches a set of feature points from another image. The registration parameters are then used to render the panoramic image.

U.S. Patent Application Publication No. US2004/0091171 to Bone discloses a method for constructing a mosaic image from an MPEG video sequence. The pictures of the MPEG compressed video are aligned and composited using motion vectors in the video sequence to achieve picture-to-picture registration.

Although the aforementioned references disclose different techniques for generating panoramas, there exists a need for automatically estimating the layout of frames to be used to generate a panorama. It is therefore an object of the present invention to provide a novel method, apparatus and computer program for automatically estimating the layout of a sequentially ordered series of frames to be used to form a panorama.

SUMMARY OF THE INVENTION

Accordingly, in one aspect there is provided a method of automatically estimating the layout of a sequentially ordered series of frames to be used to form a panorama comprising:

examining frames of said series to determine an initial flow direction;

identifying a first interruption in the series of frames; and ranking the frames in an evenly ranked matrix according to matrix dimensions based at least partly upon said initial flow direction and characteristics of said first interruption.

In one embodiment, the characteristics of the first interruption comprise both the location and type of the first interruption. The ranking is further based on the registrability of a frame of the series used to identify the first interruption with another frame of the series. During examining, the first and second frames of the series are registered to determine if the frames register side-by-side or one on top the other. During the identifying, sequential frames in the series are examined to detect a condition signifying an interruption in the linear continuity of the frames. Specifically, sequential frames in the series are registered to detect either an interruption signifying a 90 degree turn in the initial flow direction or a non-registrable frame condition. If desired, the positions of possible interruptions along the series can be estimated. In this case, only sequential frames relevant to the possible interruption positions are examined.

The method may further comprise arranging the frames in the matrix and evaluating the matrix to determine if the panorama forms a 360 degree image. During the evaluating, the first and last frames of each row of the matrix are registered. Typically, the evaluating is performed only when each row of the matrix includes a threshold number of frames.

According to another aspect there is provided a method of automatically estimating the matrix layout of a sequentially ordered series of frames to be used to form a panorama comprising:

examining frames of said series to determine whether the frames of said series are arranged row-by-row or column-by-column;

identifying the location and type of a first interruption in the series of frames representing a linear discontinuity in the frames to determine whether the rows or columns of frames are unidirectional or zig-zagging; and based on the examining and identifying, ranking the frames in an evenly ranked matrix.

According to yet another aspect there is provided an apparatus for automatically estimating the layout of a sequentially ordered series of frames to be used to form a panorama comprising:

a frame examiner examining frames of said series to determine an initial flow direction and a first interruption in the series of frames; and a frame orderer ranking the frames in an evenly ranked matrix according to matrix dimensions based at least partly upon said initial flow direction and characteristics of said first interruption.

According to yet another aspect there is provided a computer readable medium embodying a computer program for automatically estimating the layout of a sequentially ordered series of frames to be used to form a panorama, said computer program comprising:

computer program code for examining frames of said series to determine an initial flow direction;

computer program code for identifying a first interruption in the series of frames; and computer program code for ranking the frames in an evenly ranked matrix according to matrix dimensions based at least partly upon said initial flow direction and characteristics of said first interruption.

According to still yet another aspect there is provided a computer readable medium embodying a computer program for automatically estimating the layout of a sequentially ordered series of frames to be used to form a panorama, said computer program comprising:

computer program code for examining frames of said series to determine whether the frames of said series are arranged row-by-row or column-by-column;

computer program code for identifying the location and type of a first interruption in the series of frames representing a linear discontinuity in the frames to determine whether the rows or columns of frames are unidirectional or zig-zagging; and computer program code for ranking the frames in an evenly ranked matrix based on the examining and identifying.

Automatically estimating the layout of sequentially ordered series of frames to be used to generate a panorama, increases the speed by which panoramas can be generated. Also, in cases where very large numbers of frames are to be used to form the panorama, the tedious and time consuming manual step of ordering the frames is avoided.

BRIEF DESCRIPTION OF THE DRAWINGS

Embodiments will now be described more fully with reference to the accompanying drawings in which:

FIG. 1 shows an input sequentially ordered series of frames to be used to generate a panorama;

FIG. 2 shows examples of the various manners by which a three-by-three matrix of frames can be input;

FIG. 3 is a flowchart showing the general steps performed during automatic frame layout estimation;

FIG. 4 is a flowchart showing the steps performed during identification of interruptions in the input series of frames.

DETAILED DESCRIPTION OF THE EMBODIMENT

Figure 5:
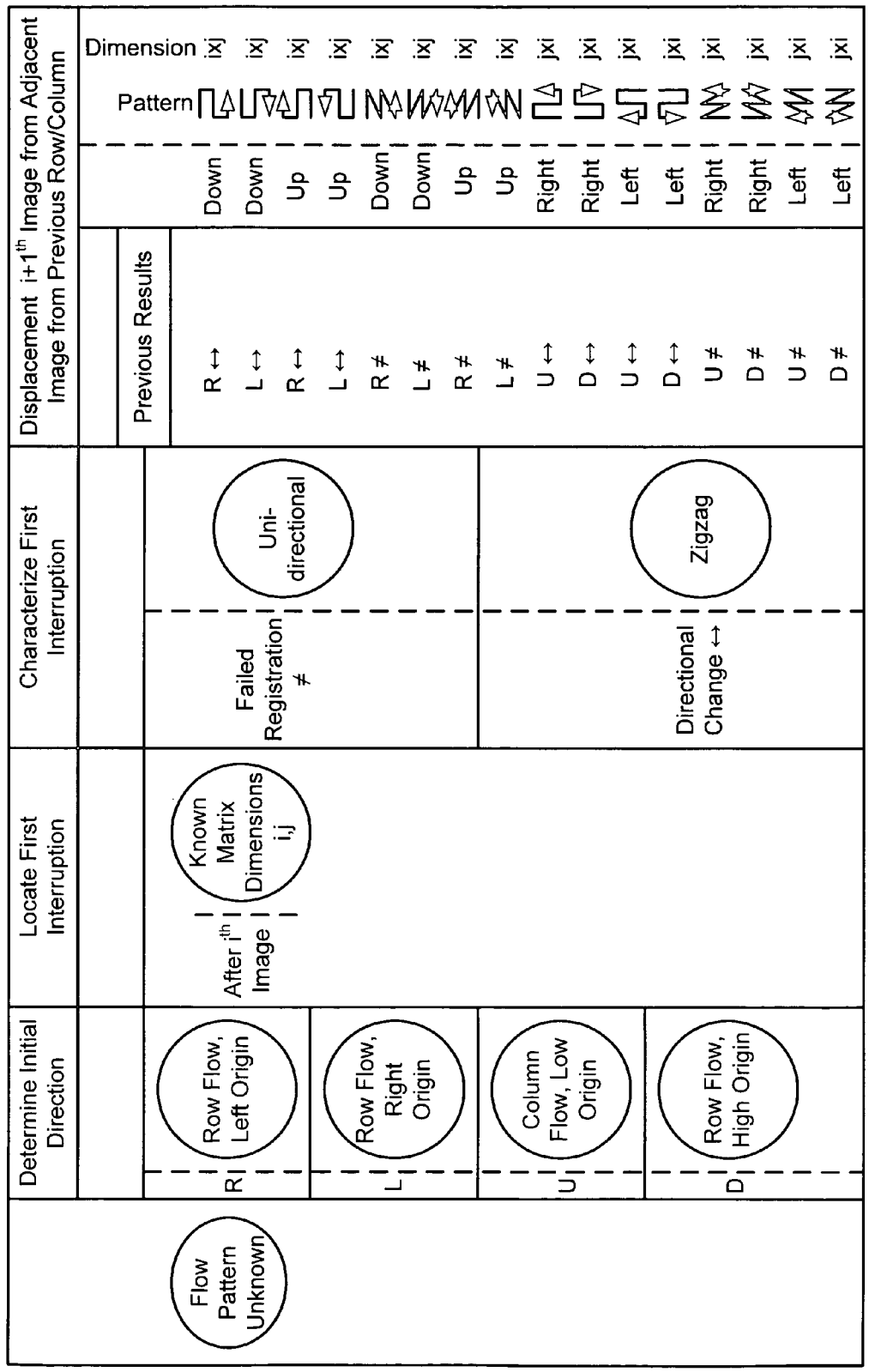
FIG. 5 is a decision tree chart showing the steps performed during automatic frame layout estimation and possible matrix configurations.

In the following description, a method, apparatus and computer program for automatically estimating the layout of a sequentially ordered series of frames to be used to generate a panorama are provided. During automatic frame layout estimation, frames of the series are examined to determine an initial flow direction. A first interruption in the series of frames is also identified. The frames are then ranked in an evenly ranked matrix according to matrix dimensions based at least partly upon the determined initial flow direction and characteristics of the first interruption.

The automatic frame layout estimation method and apparatus may be embodied in a software application including computer executable instructions executed by a processing unit such as a personal computer or other computing system environment. The software application may run as a stand-alone digital image editing tool or may be incorporated into other available digital image editing applications to provide enhanced functionality to those digital image editing applications. The software application may include program modules including routines, programs, object components, data structures etc. and be embodied as computer readable program code stored on a computer readable medium. The computer readable medium is any data storage device that can store data, which can thereafter be read by a computer system. Examples of computer readable medium include for example read-only memory, random-access memory, CD-ROMs, magnetic tape and optical data storage devices. The computer readable program code can also be distributed over a network including coupled computer systems so that the computer readable program code is stored and executed in a distributed fashion.

The automatic frame layout estimation requires that the input frames be sequentially ordered and not random and that there be no gaps between the frames. The automatic frame layout estimation also assumes that the frames to be used to generate the panorama form an evenly ranked matrix having N rows and M columns. Notwithstanding these requirements, the frames to be used to generate the panorama may be input in a number of different manners. For example, the frames may be input row-by-row and unidirectionally (i.e. the frames forming each row are input sequentially from left to right or from right to left), column-by-column and unidirectionally (i.e. the frames forming each column are input sequentially from top to bottom or from bottom to top), row-by-row and zig-zagging (i.e. the frames forming each row are input sequentially in alternating directions) and column-by-column and zig-zagging (i.e. the frames forming each column are input sequentially in alternating directions).

For ease of illustration, the automatic frame layout estimation will be described with reference to an input sequentially ordered series of frames 100 as shown in FIG. 1 that form a three-by-three matrix when combined to generate a panorama. Thus, the series 100 includes nine (9) frames $L_1$ to $L_9$. Those of skill in the art will however appreciate that the automatic frame layout estimation can be used to estimate the layout of frames forming an evenly ranked matrix of basically any size. FIG. 2 shows examples of the various manners by which the three-by-three matrix of frames can be input. As can be seen, matrices 210a to 210d represent four (4) possible row-by-row and unidirectional frame input sequences. Matrices 210e to 210h represent four (4) possible column-by-column and unidirectional frame input sequences. Matrices 210i to 210l represent four (4) possible row-by-row and zig-zagging frame input sequences. Matrices 210m to 210p represent four (4) possible column-by-column and zig-zagging frame input sequences.

In order to determine the layout of the matrix, the input series of frames is examined to detect an interruption in the series representing the start of a new row or column of frames. Interruptions may take one of two forms. In one case, the interruptions may be changes in row or column aspect, which occur when the series of frames is input row-by-row or column-by-column and unidirectionally. As will be appreciated, in these cases the linear continuity of the individual frames is interrupted whenever the frames forming a new row or column are reached. Alternatively, the interruptions may be 90 degree changes in direction, which occur when the series of frames is input row-by-row or column-by-column and zig-zagging. As will be appreciated, in these cases the linear continuity of the individual frames goes through a 90 degree turn whenever the frames forming a new row or column are reached.

Turning now to FIG. 3, the general steps performed during automatic frame layout estimation are shown and generally identified by reference numeral 300. Initially, the input sequentially ordered series of frames is examined to determine its initial flow direction i.e. whether the frames were input row-by-row or column-by-column (step 302). Once the initial flow direction is determined, the location and type of the first interruption in the series of frames is identified (step 304). With the flow direction and characteristics of the first interruption determined, the frames of the series are ranked according to matrix dimensions based on the location and type of the first interruption as well as the registrability of a frame in the series that is used to identify the first interruption, with another frame in the series thereby to estimate the matrix layout of the input frames (step 306).

At step 302, the first two frames of the series are registered to determine if they overlap side-by-side or overlap one on top the other. As will be appreciated, if the frames overlap side-by-side, the frames are deemed to have been input on a row-by-row basis. If the frames overlap one on top the other, the frames are deemed to have been input on a column-by-column basis.

During frame registration, a feature-based registration technique is used such as that described in co-pending U.S. patent application Ser. No. 10/669,828 filed on Sep. 24, 2003 and entitled "System and Method for Creating a Panorama Image From a Plurality of Source Images", assigned to the assignee of this application, the content of which is incorporated herein by reference. In this example, fine-grained registration is used to register the first two frames i.e. the parameters are set so that very accurate registration of the frames is achieved.

Completing registration between the first two frames results in a projective transform mapping the two frames. The projective transform yields parameters x' and y' that express the horizontal and vertical translation between the two frames. To determine the initial flow direction, the following rule set is used to evaluate the parameters x' and y':

[1] if x'>X AND |x'|>|y'|, then the $i^{th}$ frame is to the right of the $(i-1)^{th}$ frame;
[2] else if x'<−X AND |x'|>|y'|, then the $i^{th}$ frame is to the left of the $(i-1)^{th}$ frame;
[3] else if y'>Y AND |y'|>|x'|, then the $i^{th}$ frame is to the bottom of the $(i-1)^{th}$ frame;
[4] else if y'<−Y AND |y'|>|x'|, then the $i^{th}$ frame is to the top of the $(i-1)^{th}$ frame;
[5] else estimate default one row matrix layout, and exit the frame layout estimation process,
where:
X=0.1*Frame Width*(|y'|/|x'|); and
Y=0.1*Frame Height*(|x'|/|y'|).

At step 304, in order to identify the first interruption in the series of frames, initially the possible sites for the first interruption are estimated (see step 402 in FIG. 4) i.e. the possible row and column configurations of the matrix are considered. As will be appreciated, as the total number of frames L in the series is known, and assuming even ranks, the potential matrix layout configurations can be estimated by factorizing L=M×N. For example, in the case of the series of frames 100, the series includes 9 frames. The possible row and column matrix configurations are therefore 1×9, 3×3 or 9×1. In this case, if the initial flow direction is row-by-row, and assuming an interruption exists, then the first interruption must occur immediately after the $3^{rd}$ frame in the series. Performing this initial interruption location estimation narrows searching and allows only relevant sequential pairs of frames in the series to be interrogated to determine the actual location and type of the interruption.

With the locations of the potential first interruption estimated, the sequential pairs of frames which are relevant to (i.e. on opposite sides of) the estimated interruption locations are examined in order to determine whether an actual interruption exists. In order to determine the existence of an actual interruption, the sequential frames relevant to the first estimated interruption location are registered in the same manner as previously described (step 404). In this case however, coarse-grained registration is performed to speed up the registration process.

The results of the registration are then examined (step 406) to determine if:
[6] the frames could not be successfully registered together signifying a change in row or column aspect; or
[7] the flow direction between the frames is different than the flow direction of the first two frames signifying a change in the direction of frame continuity.

If one of the above conditions [6] or [7] is met signifying the existence of an interruption (step 408), a fine-grained registration is performed on the frames to confirm the validity of the interruption (steps 410 and 412).

If one of the above conditions [6] or [7] is not met or if the fine-grained registration does not confirm the validity of the interruption, the sequential frames relevant to the next estimated interruption location, if they exist, are selected and registered (steps 414 and 416) and above steps 406 to 412 are re-performed. As will be appreciated, steps 406 to 412 are performed either until a pair of sequential frames is found that confirm the location of an interruption or until all of the relevant pairs of sequential frames have been examined and no interruption is determined. This latter condition signifies that the matrix is of a 1×N or M×1 configuration (step 418).

Once the location of the first interruption has been verified at step 412, the dimensions of the matrix layout are determined (step 420). With the $i^{th}$ frame and $(i+1)^{th}$ frame confirming the location of the interruption, if the initial flow direction is row-by-row, the matrix is determined to have i columns and j=L/i rows. If the initial flow direction is column-by-column, the matrix is determined to have i rows and j=L/i columns.

Following this, the type of the interruption is determined by examining the condition that was met signifying existence of the actual interruption (step 422). As mentioned above, condition [6] is consistent with an interruption representing a change in row or column aspect and condition [7] is consistent with an interruption representing a change in direction of frame continuity.

If condition [6] is met, the layout of the matrix is either row-by-row and unidirectional or column-by-column and unidirectional as determined by the flow direction of the first two frames in the series. The particular matrix layout is verified by registering the second or $(i+1)^{th}$ frame that was used to confirm the location of the interruption, with the first frame in the series in a similar manner as previously described. As will be appreciated, if the layout of the matrix is row-by-row and unidirectional, the second or $(i+1)^{th}$ frame should be either above or below first frame in the series. If the layout of the matrix is column-by-column and unidirectional, the second or $(i+1)^{th}$ frame should be to one side of first frame in the series. The following rule set is used to evaluate the registration results:

[8] if x'>X AND |x'|>|y'|, then the $(i+1)^{th}$ frame is to the right of the first frame;

[9] else if x'<−X AND |x'|>|y'|, then the $(i+1)^{th}$ frame is to the left of the first frame;

[10] else if y'>Y AND |y'|>|x'|, then the $(i+1)^{th}$ frame is to the bottom of the first frame;

[11] else if y'<−Y AND |y'|>|x'|, then the $(i+1)^{th}$ frame is to the top of the first frame.

[12] else estimate default one row matrix layout, and exit the frame layout estimation process.

Once the registration results are evaluated, the layout of the frames is known allowing each of the frames in the series to be assigned or ranked its correct position in the matrix (step 306). The series of frames can then be arranged into the appropriate matrix layout.

If condition [7] is met, the layout of the matrix is either row-by-row and zig-zagging or column-by-column and zig-zagging as determined by the flow direction of the first two frames in the series. The registration result at either step 404 or 416 also verifies the relative position of the $i^{th}$ and $(i+1)^{th}$ frames and hence, the zig-zagging direction of the frames. At this stage, the layout of the frames is known allowing each of the frames in the series to be assigned its correct position in the matrix. The series of frames can then be arranged into the appropriate matrix layout.

As will be appreciated, the layout estimation differentiates between column-by-column and row-by-row input frame sequences, determines matrix dimensions, and differentiates between unidirectional and zig-zagging input frame sequences allowing the frames of the series to be evenly ranked in the matrix.

FIG. 5 is a decision tree summarizing the relationship between the steps of the frame layout estimation and the resultant flow directions and matrix configurations. Initially, the flow direction is unknown. Upon determination of initial flow direction, the possible matrix configurations are restricted to a quarter of the overall possibilities (the R, L, U or D patterns in the decision tree). Although locating the first interruption does not provide matrix configuration information, it does provide the dimensions of the matrix. Characterizing the type of the interruption again halves the possible matrix configurations. Registration of the second or $(i+1)^{th}$ frame that was used to confirm the existence of the interruption, with either the first frame in the series or the $i^{th}$ frame in the series is the final factor which yields the exact matrix configuration i.e. its layout.

If desired, once the frames have been arranged to form the matrix, the matrix may be interrogated in order to determine if the frames form a 360 degree panoramic scene. During this procedure, coarse-grained registration is applied between the first frame and last frame of each row in the matrix. If all frame pairs can be registered successfully, the frames of the matrix are deemed to represent a 360 degree panorama. Generally, this interrogation is performed only when the matrix rows contain five (5) or more frames.

In the above example, the positions of interruptions are initially estimated and then only the pairs of sequential frames relevant to the estimated interruption positions are examined to confirm the location of the first interruption. Those of skill in the art will appreciate that rather than performing the initial interruption position estimation, it is possible to exhaustively examine each sequential pair of frames in the series in order until the first interruption is located and verified.

Those of skill in the art will also appreciate that although exemplary input frame sequences are shown, the frame layout estimation may be modified to detect additional input frame sequences by identifying interruptions characteristic of these input frame sequences.

Although an embodiment has been described, those of skill in the art will appreciate that variations and modifications may be made without departing from the spirit and scope thereof as defined by the claims.

What is claimed is:

1. A method of automatically estimating the layout of a sequentially ordered series of frames to be used to form a panorama comprising:

examining frames of the series to determine an initial flow direction;

identifying a first interruption in the series of frames;

ranking the frames in an evenly ranked matrix according to matrix dimensions based at least partly upon the initial flow direction and characteristics of the first interruption;

arranging the frames in the matrix and evaluating the matrix to determine if the panorama forms a 360 degree image; and wherein during the evaluating the first and last frames of each row of the matrix are registered; and the evaluating is performed when each row of the matrix includes a threshold number of frames; and in accordance with the rankings, arranging the frames into a layout that represents the panorama.

2. The method of claim 1 wherein the characteristics of the first interruption comprise both the location and type of the first interruption.

3. The method of claim 2 wherein the ranking is further based on the registrability of a frame of the series used to identify the first interruption with another frame of the series.

4. The method of claim 3 wherein the examining comprises registering the first and second frames of the series to determine if the frames register side-by-side or one on top the other.

5. The method of claim 4 wherein a fine-grained feature-based registration is performed to register accurately the first and second frames of the series.

6. The method of claim 4 wherein the identifying comprises examining sequential frames in the series to detect a condition signifying an interruption in the linear continuity of the frames.

7. The method of claim 6 wherein the examining comprises registering sequential frames in the series to detect either an interruption signifying a 90 degree turn in the initial flow direction or a non-registrable frame condition.

8. The method of claim 7 wherein a coarse-grained feature-based registration is performed to register the sequential frames of the series.

9. The method of claim 7 wherein identification of the interruption is verified once detected.

10. The method of claim 9 wherein during verification, the second frame of the registered sequential frames is registered with the first frame of the registered sequential frames when the interruption signifies a 90 degree turn in the initial flow direction or is registered with the first frame of the series when the interruption signifies a non-registrable frame condition.

11. The method of claim 9 wherein the identifying further comprises estimating the positions of possible interruptions along the series, during the examining only sequential frames relevant to the possible interruption positions being examined.

12. The method of claim 11 wherein the sequential frames relevant to the possible interruption positions are examined in order until an interruption is identified.

13. The method of claim 12 wherein the possible interruption positions are based on possible configurations of the matrix as determined by the number of frames in the series and knowing that the matrix is evenly ranked.

14. The method of claim 6 wherein the identifying further comprises estimating the positions of possible interruptions along the series, during the examining only sequential frames relevant to the possible interruption positions being examined.

15. The method of claim 14 wherein the sequential frames relevant to the possible interruption positions are examined in order until an interruption is identified.

16. The method of claim 15 wherein the possible interruption positions are based on possible configurations of the matrix as determined by the number of frames in the series and knowing that the matrix is evenly ranked.

* * * * *